United States Patent Office 3,814,627
Patented June 4, 1974

3,814,627
POLYESTER YARN
Robert Moore Marshall and Sung Kun Pak, Chester, and Kimon Constantine Dardoufas, Richmond, Va., assignors to Allied Chemical Corporation, New York, N.Y.
No Drawing. Filed Jan. 21, 1972, Ser. No. 219,900
Int. Cl. B32b 27/02, 27/16
U.S. Cl. 117—138.8 F
1 Claim

ABSTRACT OF THE DISCLOSURE

An improved polyester yarn is prepared by applying to the yarn a finish composition comprising an aqueous dispersion of colloidal silica and a polyethylene glycol ester of a $C_6$ to $C_{18}$ aliphatic acid, said polyethylene glycol having a molecular weight of about 200 to 600.

BACKGROUND OF THE INVENTION

This invention relates to finished polyester yarns. More particularly, it relates to multifilament polyethylene terephthalate yarns having applied finishes which enable the yarns to be satisfactorily processed and utilized in the commercial production of braided hose, rope belts, etc.

Polyester yarns, for example polyethylene terephthalate yarns, tend to develop high electrostatic charges and excessive tensions when running over guides, tension gates and other objects during processing and subsequent handling. The utilization of unfinished polyester yarns in textile production is unsatisfactory.

Static and tension problems have been encountered in the use of other natural and synthetic polymer yarns, and finishes which are satisfactory from both the standpoints of application and use have been developed for them. However, the polyesters have different physical characteristics than most other filament forming polymers and conventional finishes are not suitable to provide the optimum combination of lubrication and bundle cohesion to overcome processing problems.

SUMMARY OF THE INVENTION

The primary object of this invention is to provide a finished polyester yarn that is suitable for high speed processing.

It is another object of this invention to provide a method of finishing polyester yarn which is effective in providing a desirable combination of lubrication and bundle cohesion to overcome processing problems.

It is yet another object of this invention to provide an overfinish for polyester yarn which enables the use of the yarn for industrial purposes such as braided hose, rope belts, etc., without need of twisting to control loose filaments.

It is still another object of this invention to provide an overfinish for polyester yarn which provides a balance of yarn to yarn friction and cohesion required for good package formation in rewinding the yarn on cones.

These and other objects are accomplished in accordance with this invention with a finish composition for polyester yarns consisting essentially of 60 to 90 parts by weight of an aqueous dispersion of colloidal silica, containing, for example, about 25 to 50 weight percent silica in the form of a stable silica sol, and 10 to 40 parts by weight of a polyethylene glycol ester of a $C_6$–$C_{18}$ aliphatic acid, said polyethylene glycol preferably having a molecular weight of about 200 to 600. The finish composition may be diluted with water to a water content up to about 80 weight percent of the diluted composition. The finish composition is applied to polyester yarns including, for example, polyethylene terephthalate yarns by any known means including bath, spray, padding, kiss roll application or the like. Preferably, the composition is applied to the yarn in an amount sufficient to supply 0.1 to 5% silica based on the weight of the yarn.

The colloidal silica dispersions or sols used in accordance with the invention may be prepared by reacting an acid, such as a mineral acid capable of forming salts by reaction with silicates, with a water-soluble silicate in the manner customarily employed to form silica gel, and washing the resulting gel with water to remove electrolytes. The gel is then treated with a weak aqueous solution of a substance capable of forming hydroxyl ions and, after removing the gel from solution, heating the gel while avoiding evaporation of water until the gel is converted to a sol.

Aqueous dispersions of colloidal silica prepared in the above manner are particularly adapted for the purposes of the invention. It is possible, however, to prepare the colloidal dispersions or sols as described above, then to acidify them and use them in a slightly acid condition, when desired. Other types of colloidal solutions or sols of silica may also be used. For example, the sols may be prepared by reacting water-soluble silicates with an acid and subjecting the acidified silicate to treatment with alcohol and/or cooling to remove the electrolyte, as described in U.S. Pat. 2,285,449 and U.S. Pat. 2,285,477. It is also possible to use sols prepared by treatment of an alkali silicate with an ion-exchange material as described in U.S. Pat. 2,244,325.

The concentration of the colloidal dispersion of silica used is relatively unimportant, as it is possible to employ a wide variety of solution strengths depending on the type of apparatus used or the degree of pick-up which is possible in the particular apparatus employed. Generally, commercially available aqueous dispersions of colloidal silica are employed containing say 25% to 50% silica. As indicated above, such dispersions of colloidal silica may be diluted with water if desired.

The ethylene glycols having average molecular weights above about 200 are usually classified as polyethylene glycols, $HO(CH_2CH_2O)_nH$, where $n$ is equal to or greater than 4. They are water-white liquids at ambient temperature up to molecular weights of about 700. Polyethylene glycols having molecular weights of about 200–600 are preferred for use in the present invention. The commercially available polyethylene glycols are actually mixtures of many polyethylene glycols. The polyethylene glycols are prepared commercially by the addition of ethylene oxide to either water, ethylene glycol, or diethylene glycol containing a small amount of sodium hydroxide catalyst. The principal derivatives of the polyethylene glycols are the mono- and diesters, especially the aliphatic acid esters. These esters are manufactured by typical esterification techniques with esterification temperatures often reaching 150–200° C. The esters of the invention are preferably monoesters of aliphatic acids having 6–18 carbon atoms. Preferred aliphatic acids of the invention include, for example, stearic acid, palmitic acid, lauric acid, pelargonic acid and capric acid.

DESCRIPTION OF THE PREFERRED EMBODIMENT

In order to demonstrate the invention, the following examples are given. They are provided for illustrative purposes only and are not to be construed as limiting the scope of the invention, which is defined by the appended claim. In these examples, parts and percentages are by weight.

EXAMPLE I

The silica sol used in this example was a standard commercially available colloidal aqueous silica dispersion having the following analysis:

| | |
|---|---|
| Solids, weight percent | 30 |
| Water, weight percent | 70 |
| Specific gravity at 25° C. | 1.2 |
| pH at 25° C. | 9.9 |
| Mol ratio $SiO_2/Na_2O$ | 90 |

A mixed composition of 70 parts of the above-described aqueous dispersion of silica and 30 parts of a monopelargonate ester of 400 molecular weight (9–10 ethylene oxide units) polyethylene glycol was prepared as a typical finish solution of the present invention. Then the finish solution was applied as an overfinish to convention high compaction polyethylene terephthalate yarn (approximately 1300 denier, 192 filament yarn) by means of kiss roll prior to coning. The finish was found to be a significant aid in processing the yarn through the coming operation. The finished yarn gave excellent performance in braiding and winding operations during manufacture of industrial rope.

EXAMPLE II

A finish composition was prepared and applied to polyester fiber as described in Example I except that the finish was diluted with an equal weight of water. The fiber was found to have even better processing properties than the overfinished yarn of Example I.

EXAMPLE III

A finish composition was prepared and applied to polyester fiber as described in Example I except that 20 parts of the polyethylene glycol monopelargonate was combined with 80 parts of the silica dispersion. The fiber was found to have processing properties slightly inferior to those of the overfinished yarn of Example I.

EXAMPLE IV

A finish composition was prepared and applied to polyester fiber as described in Example I except that 40 parts of the polyethylene glycol monopelargonate was combined with 60 parts of the silica dispersion. This fiber was found to have processing properties equal to the overfinished yarn in Example III.

EXAMPLE V

A finish composition was prepared and applied to polyester fiber as described in Example I except that 30 parts of a monolaurate ester of 400 molecular weight polyethylene glycol was substituted for the monopelargonate ester used in Example I. The fiber was found to have processing properties slightly inferior to those of the overfinished yarn of Example I.

In each of the above examples, it was found that the finish system provides exceptional filament cohesive properties. The overfinish enables the use of these yarns for industrial purposes such as braided hose, rope belts, etc. without need of twisting to control loose filaments. In addition, it provides the proper balance of yarn to yarn friction and cohesion required for good package formation in rewinding yarn on cones. Particularly preferred results were obtained when the overfinish was incorporated on the yarn in an amount to supply about 0.1% to 0.5% silica based on the weight of the yarn.

We claim:

1. Polyethylene terephthalate yarn having incorporated thereon a finish composition consisting essentially of 70 parts by weight of an aqueous dispersion of colloidal silica containing about 30 weight percent silica, and 30 parts by weight of a monopelargonate ester of a polyethylene glycol, said polyethylene glycol having a molecular weight of 400, said finish composition being incorporated on the yarn in an amount sufficient to supply from about 0.1% to 5% of silica based on the weight of the yarn.

References Cited

UNITED STATES PATENTS

| | | | |
|---|---|---|---|
| 3,377,293 | 4/1968 | Shepherd | 252—309 |
| 3,016,304 | 1/1962 | Preston et al. | 117—139.5 |
| 2,920,980 | 1/1960 | Mooberry | 117—138.8 |
| 3,396,046 | 8/1968 | Landau | 117—138.8 |
| 2,885,308 | 5/1959 | Healy | 117—139.5 |
| 2,527,329 | 10/1950 | Powers et al. | 117—139.5 |
| 3,428,560 | 2/1969 | Olsen | 117—139.5 |

MICHAEL SOFOCLEOUS, Primary Examiner

S. L. CHILDS, Assistant Examiner

U.S. Cl. X.R.

117—139.5 CF; 252—8.6, 8.9, 313 S